(12) United States Patent
Moldovyan et al.

(10) Patent No.: US 6,463,150 B1
(45) Date of Patent: Oct. 8, 2002

(54) ENCRYPTION DEVICE FOR INFORMATION IN BINARY CODE

(75) Inventors: Alexandr Andreevich Moldovyan, Vsevolozhsk (RU); Nikolay Andreevich Moldovyan, Vsevolozhsk (RU); Petr Andreevich Moldovyanu, Vsevolozhsk (RU)

(73) Assignee: Otkrytoye Akttsionemoye Obschestyo "Moskovskaya Gorodskaya Telefonnaya Set", Moscow (RU)

( * ) Notice: Subject to any disclaimer, the term of this patent is extended or adjusted under 35 U.S.C. 154(b) by 0 days.

(21) Appl. No.: 09/194,748

(22) PCT Filed: Dec. 12, 1997

(86) PCT No.: PCT/RU97/00419

§ 371 (c)(1),
(2), (4) Date: Jul. 2, 1999

(87) PCT Pub. No.: WO98/44678

PCT Pub. Date: Oct. 8, 1998

(30) Foreign Application Priority Data

Apr. 2, 1997 (RU) .......................................... 97104754

(51) Int. Cl.$^7$ ................................................. H04K 9/06
(52) U.S. Cl. ...................................................... 380/28
(58) Field of Search ............................. 380/28, 29, 37, 380/30, 43, 44, 46, 42

(56) References Cited

U.S. PATENT DOCUMENTS

| | | | |
|---|---|---|---|
| 4,157,454 A | * 6/1979 | Becker | 380/37 |
| 5,003,596 A | 3/1991 | Wood | |
| 5,142,578 A | * 8/1992 | Matyas et al. | 380/280 |
| 5,778,074 A | * 7/1998 | Garcken et al. | 380/37 |
| 6,298,136 B1 | * 10/2001 | Den Boer | 380/29 |

OTHER PUBLICATIONS

The Cipher RC5, R. Rivest, The RC5 Encryption Algorithm, Fast Software Encryption, Second International Workshop Proceedings (Leuven, Belgium, Dec. 14–16, 1994), Lecture notes in Computer Science, v. 1008, Springer–Verlag, 1995, pp. 86–96).

Kaliski B.S., Yin Y.L. On Differential and Linear Cryptanalysis of the RC5 Encryption Algorithm, Advances in Cryptology—CRYPTO' 95 Proc., Springer–Verlag, 1995, pp. 171–184.

US Standard DES (National Bureau of Standards, Data Encryption Standard. Federal Information Processing Standards Publication 46, Jan. 1977.

B. Schneier, "Applied Cryptography", Second Edition, John Wiley & Sons, Inc., New York, 1966, pp. 416–418.

B. Schneier, Applied Cryptography, Second Edition, John Wiley & Sons, Inc., New York, 1966, pp. 342–344.

B. Scneier, Applied Cryptography. Second Edition, John Wiley & Sons, Inc., New York, 1966, pp. 311–313.

Kaliski, B.S., Robshaw, M.J.B., Fast Block Cipher Proposal; Fast Software Encription, Proceedings of the Cambridge Security Workshop, Lecture Notes in Computer Science, V. 809, Springer–Veriag, 1994, pp. 33–39.

* cited by examiner

*Primary Examiner*—Matthew Smithers
(74) *Attorney, Agent, or Firm*—McDermott, Will & Emery

(57) ABSTRACT

The invention relates to telecommunications and computer engineering, and especially to cryptographic methods and devices intended to encrypt numerical data. The inventive method comprises the steps of working out $K \geq$ data blocks containing $P \geq 1$ elements of the binary information code and of converting data blocks under control of an encryption key. The novelty of the system consists in that $D \geq 1$ binary vectors are additionally generated, that the data blocks are formed by linking the binary vectors to the corresponding elements of the binary information code, that the binary vectors are generated at random and pseudorandom, that they are linked to the corresponding elements of the binary information code, and that this linkage is based on the secret key.

5 Claims, 3 Drawing Sheets

ENCRYPTION DEVICE FOR INFORMATION IN BINARY CODE

The invention relates to the field of telecommunications and computer engineering, and more particularly, to cryptographic methods and devices intended to encrypt messages (data).

PRIOR ART

Used in the description of the claimed method, as taken in the aggregate of its features, are the following concepts.

By "secret key" we shall mean a binary information that is only known to the authorized user.

By "cipher" we shall mean the combination of elementary steps of the process of input data conversion using the secret key, which is implementable either in the form of a computer program or as a separate unit.

"Encryption" is the process of digital information conversion under control of the secret key, allowing to transform the source data into a ciphered text represented by a pseudorandom sequence of characters such that it is practically impossible to derive any information therefrom without being acquainted with the key.

"Decryption" is the process reverse of that of encryption which permits to recover the information according to the cryptogram provided that the operator is aware of the encryption key.

By "binary vector" is generally meant a certain sequence of on- and off-bits, e.g. that corresponding to the hum noise or to the spurious signals present in the communication link; in the present Application, the binary vector signifies a train of ordered bits not interpreted by the acceptor (receiver) of data as a desired signal or as the information.

"Pseudorandom law of forming binary vectors" represents a predetermined rule of generation of an extended sequence of bits on the basis of an initial parameter and of subdividing said sequence into elements of necessary size; it is possible to use, as such as initial parameter, the secret key or a randomly chosen number; if its value is unknown, the output sequence will be in fact indistinguishable from randomly generated signals.

"Cryptanalysis" is the technique of calculating the secret key in order to have an unauthorized access to the encrypted information or the elaboration of a method allowing to access to such an information without having to calculate the secret key.

"Cryptographic resistance" constitutes the measure of the reliability of data protection and represents the labour intensity given in terms of the number of elementary operations to be executed in order to recover the information according to the cryptogram in conditions where the operator is acquainted with the conversion algorithm and not with the secret key.

Known are various methods of block encryption of data: see e.g. the cipher RC5 [R. Rivest, The RC5 Encryption Algorithm, Fast Software Encryption, Second International Workshop Proceedings (Leuven, Belgium, Dec. 14–16, 1994), Lecture Notes in Computer Science, v. 1008, Springer-Verlag, 1995, pp.86–96]. In accordance with this conventional method, the encryption of data blocks is performed by forming a secret key, then subdividing the data block to be converted into subblocks and alternately alterating these latter by means of cyclic shift operations, and finally, taking a modulo 2 sum and a modulo $2^{32}$ sum on the current block. This block method ensures a high encryption rate in case of implementation of the cipher in the form of a computer program.

However, it doesn't show sufficient resistance to the differential and linear cryptanalysis [Kaliski B. S., Yin Y. L. On Diferential and Linear Cryptanalysis of the RC5 Encryption Algorithm. Advances In Cryptology—CRYPTO'95 Proc., Springer-Verlag, 1995, pp. 171–184] owing to the fact that with such a cryptanalytic technique, the attacker has the possibility to encrypt specially selected original texts.

One may consider as the method closest, as to its technical essence, to the claimed method of block encryption, that described in the US Standard DES [National Bureau of Standards, Data Encryption Standard. Federal Information Processing Standards Publication 46, January 1977]. This method comprises the steps of forming a secret key of a certain length, dividing the input information presented in the form of a binary code into elements 64 bits long, generating, on the basis of these latter, 64-bit data blocks, and converting said blocks under control of the secret key. Prior to the conversion, each data block is divided into two 32-bit subblocks L and R which are then alternately treated during 16 similar rounds of conversion. A single conversion round consists in operations of substitution, permutation and taking a modulo 2 sum made on the subblock R. Each round is terminated in the permutation of the subblocks R and L. The above-described method of block encryption of information gives high conversion rates in case of implementation in the form of specialized electronic circuits.

Unfortunately, it suffers from the drawback consisting in that when using this method, it becomes possible to efficiently apply various cryptanalytic techniques based upon specially selected input blocks of the initial text. This disadvantage is due to the fact that in such a cryptanalysis, the analyst becomes capable of selecting initial input texts whose encryption is accompanied with the exhibition of the statistic properties of the encryption algorithm.

Therefore, the objective of the invention is to provide a method of encrypting binary coded information according to which the conversion of input data is performed so as to allow, with a given fixed secret key, to convert the initial text into a ciphered text whose structure would not be predetermined, thus rendering more difficult the detection of the statistic properties of the encryption algorithm and consequently, improving the resistance to the cryptanalysis made on the basis of selected original texts.

DISCLOSURE OF THE INVENTION

The above problem is solved by providing a method of encrypting binary coded information comprising the steps of forming a secret key, working out $K \geq$ data blocks containing $P \geq 1$ elements of the binary information code, and converting the data blocks under control of the secret key, characterized in that $D \geq 1$ binary vectors are additionally generated and that the data blocks are worked out by linking the binary vectors to the corresponding elements of the binary information code.

With such a solution, the configuration of the blocks of encrypted text depends not only upon the secret key and the structure of elements of binary information code, but also upon the structure of the binary vectors, resulting in that said configuration of the blocks of encrypted text is not longer predetermined for a given initial text and the adopted secret key. In consequence, it becomes more difficult to reveal the statistic properties of the encryption algorithm, thereby leading to an increase in the resistance to cryptanalysis performed on the basis of selected source texts.

Another novel feature of the invention consists in that these vectors are generated at random. This allows to obtain a random modification of a block of encrypted text, thus improving the resistance to cryptanalyses made according to known methods.

Still another feature consists in that the binary vectors are generated at pseudorandom, thus giving possibility to implement the claimed method on PC by means of software without having to use additional electronic circuits for generating random numbers.

Yet another novel feature consists in that the binary vectors are linked to the corresponding elements of the binary information code based on the secret key. This solution ensures an increase in the resistance of the encryption system due to the introduction of a supplementary uncertainty in the procedures of working out data blocks.

The present invention will be now explained more in detail by way of some exemplary embodiments thereof made with reference to the attached drawings.

PREFERRED EMBODIMENTS OF THE INVENTION

Figure 1:
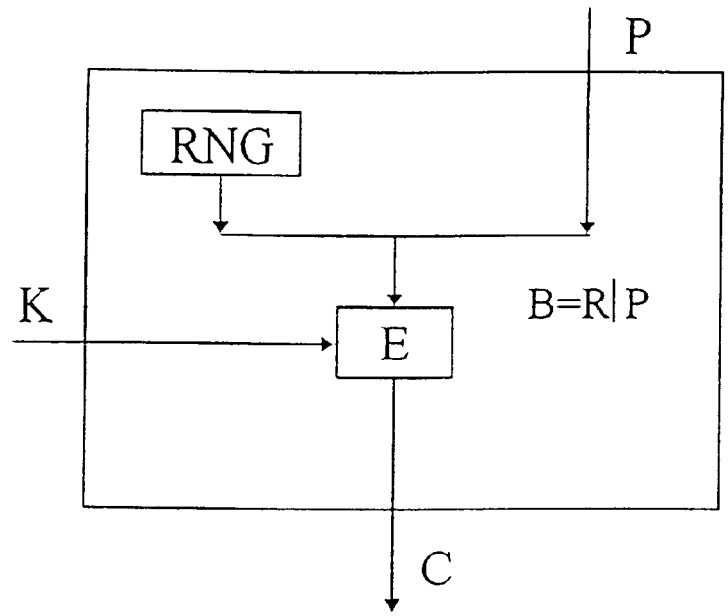
FIG. 1 schematically shows the process of encryption of an initial text P according to the proposed method.

The invention will be more easily understood with the aid of the general diagram of cryptographic conversion of data blocks in accordance with the claimed method given in FIG. 1 where:

the unit RNG is a random-number generator, R is a random binary vector, R is an element of the binary information to be converted, E represents an encryption unit, K is the secret key, C is the output encrypted text, and [|] represents the sign symbolizing the concatenation operation.

Inside the encryption system, an element of the binary information is linked to a randomly generated binary vector R to form a data block B=R|P which is supplied to the input of the encryption unit E that works out an encrypted text C.

It is assumed in accordance with the invention that the block generating binary vectors forms part of the cipher and therefore, cannot be substituted, in the course of a cryptanalysis performed on the basis of selected texts, by an adverse analyst; nor can be changed the algorithm of encryption. This latter provision constitutes a requirement which is common to all the known ciphers. The structure of a binary vector varies in an unpredictable manner during the encryption procedure, inasmuch as it is delivered by the random-number generator. So, the data block to be encrypted, which is obtained after having linked the binary vector to the input block, cannot be known or selected beforehand, thereby producing a hardly surmountable obstacle on the way of an attack undertaken on the basis of selected initial texts.

Since the authorized user is informed of the encryption key, he can, using a suitable algorithm, restore the structure of the binary vectors and that of the input block. If this user isolates and discards a binary vector not containing any part of the information to be transmitted, he will completely and univocally recover the invention intended for him.

Figure 2:
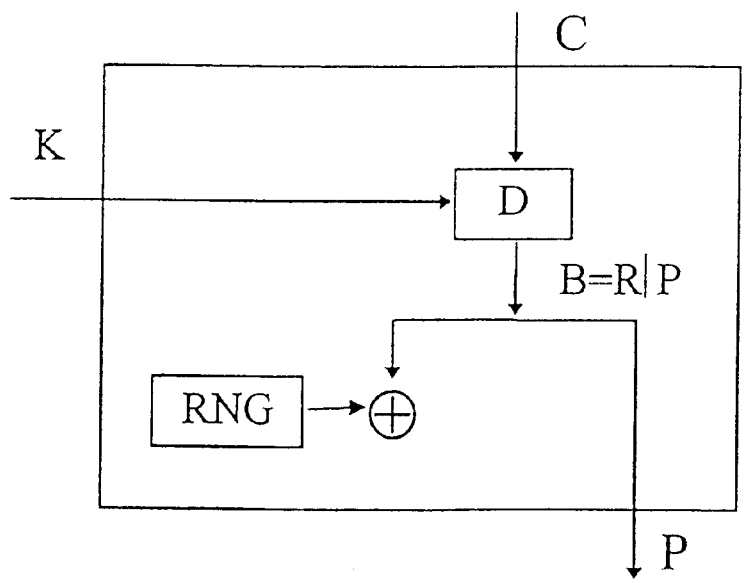
FIG. 2 shows a block diagram of the process of decryption of the encrypted text C.

FIG. 2 shows a block diagram illustrating the decryption procedure according to the invention. A block of encrypted text is fed to the decryption unit D which ensures the recovery of the value of the data block B=R|P using the entered secret key K. The restored binary vectors R that has been previously worked out and used in the encryption process, will be erased inside the encryption system by way of bit-by-bit summing to modulo 2 over R and over some new random value delivered at the output of the random-number generator.

The random generation of binary vectors can be carried out e.g. by measuring a probabilistic physical process or the signal of a noise transducer for which it is possible to employ, in many applications, specially designed electronic circuits. According to another embodiment, one can use. Instead of the random-number generator, a pseudorandom-number generator whose input is supplied with a randomly chosen binary number, so as to obtain at its output a pseudorandom sequence of required size. Known are a number of methods of building up pseudorandom-number generators: see for example [B. Schneier, "Applied Cryptography", Second Edition, John Wiley & Sons, Inc., New York, 1966, pp. 416–418], which can well be used in implementing the claimed solution. The use of such a generator allows to embody the proposed method by means of software facilities, if we take e.g., as an initial random number, the value of the time interval elapsed between successive keystrokes.

In order to encrypt conversions of subblocks, it is possible to use e.g. the above-mentioned analogous prior art method or that closest to the claimed one, as well as another known block encryption method described in the U.S. Pat. No. 5,003,596 [M. C. Wood. "Method of Cryptographically Transforming Electronic Digital Data from One Form to Another", U.S. Pat. No. 5,003,596, Mar. 26, 1991].

The technological feasibility of the claimed method is evidenced by means of the following particular examples of embodiments thereof. For brevity and ease of understanding, these examples are given in the form of algorithms which constitute a sort of logical record of successive procedures for implementing particular embodiments of the proposed block encryption method.

EXAMPLE 1

This Example serves to illustrate the method of encrypting information presented in the form of a binary code subdivided into 32-bit elements. The unit E used here ensures the performance of the encryption of 64-bit data blocks according to the above closest prior art method. For the description of Example 1, the following algorithm is used.

Algorithm 1: 32-bit block cipher
1. Take a next 32-bit element of the binary information code P, work out a 32-bit random vector R and generate a data block B=R|P where the sign "|" symbolizes the concatenation (linkage).
2. Using the closet prior art method, encrypt the 64-bit data block.

EXAMPLE 2

This Example illustrates the method of encrypting information presented in the form of a binary code subdivided into 12-bit elements. It can use any known method of encrypting 64-bit blocks B (where B=X|Y). e.g. the closest prior art method. The encryption function is designated by E(B), i.e. when encrypting the block B, this latter will be converted according to the rule B←E(B), where "←" serves to denote the assignment operation. For the description of Example 2, the following algorithm is used.

Algorithm 2: 48-bit block cipher
1. Form an encryption key.
2. Take next four 12-bit elements of binary information code $p_1$, $p_2$, $p_3$ and $p_4$, work out at random four 20 bit binary vectors $v_1$, $v_2$, $v_3$ and $v_4$, and generate a data block $P=p_1|v_1|p_2|v_2|p_3|v_3\ p_4|v_4$.
3. Subdivide the data block P into two subblocks: P=X|Y, where $X=p_1|v_1|p_2|v_2$ and $Y=p_3|v_3\ p_4|v_4$.
4. Convert the subblock X: X←E(X).
5. Superpose the subblock X onto the subblock Y: Y←Y⊕X where the symbol "⊕" denotes the operation of bit-by-bit summing to modulo 2.
6. Convert the subblock Y: Y←E(Y).
7. Superpose the subblock Y onto the subblock X: X←Y⊕Y.
8. Convert the subblock X: X←E(X).
9. Superpose the subblock X onto the subblock Y: Y←Y⊕X.
10. Convert the subblock Y: Y←E(Y).
11. Superpose the subblock Y onto the subblock X: X←X⊕Y.
12. Deliver the block X|Y as the output block of the encrypted text.

Figure 3:
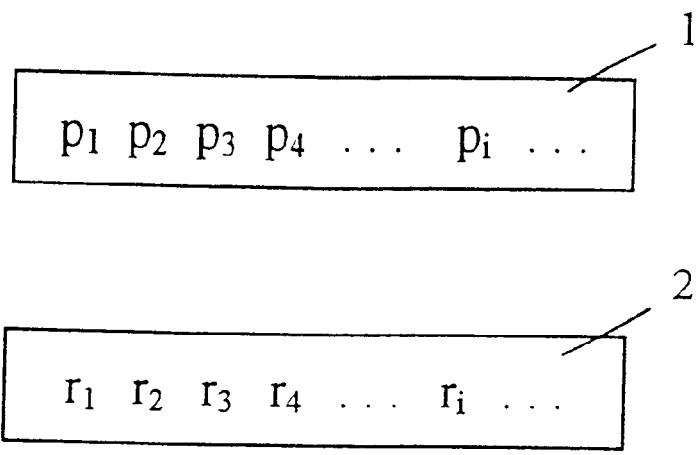
FIG. 3 represents a scheme for subdividing the binary information code into elements $p_1, p_2, \ldots, p_i, \ldots$ and a set of generated binary vectors $r_1, r_2, \ldots, r_i, \ldots$.
Figure 4:
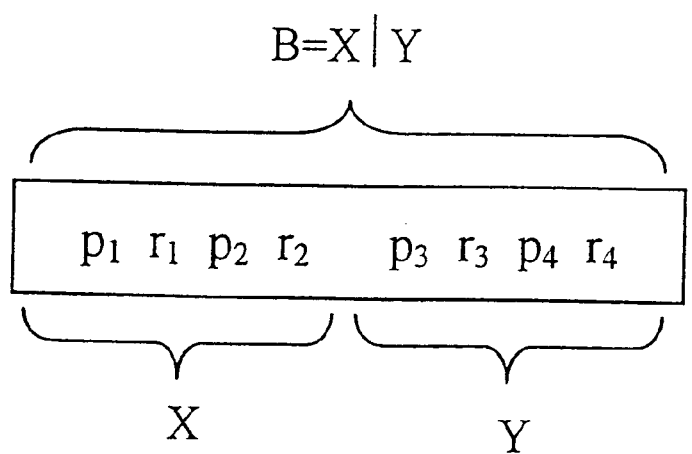
FIG. 4 schematically shows an input data block worked out by linking the elements of binary information code to the binary vectors.
Figure 5:
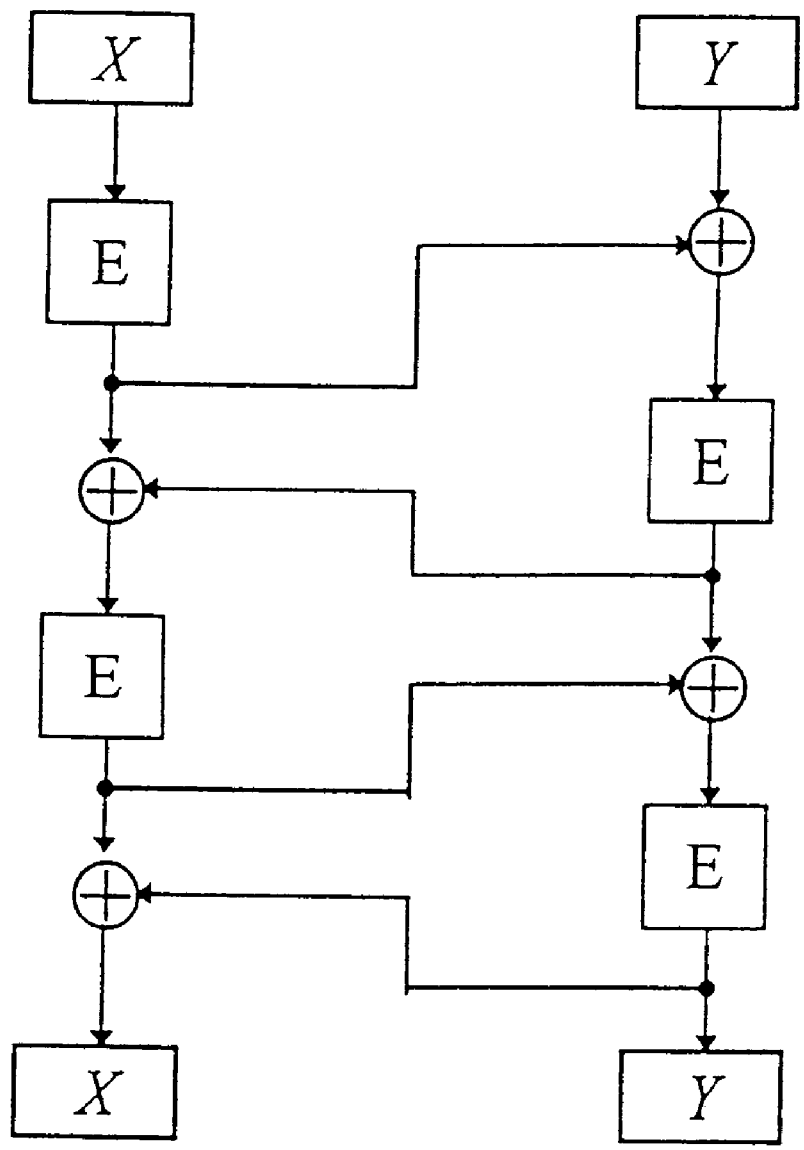
FIG. 5 shows a block diagram of encryption in relation to the Example 2 below.

The above Example 2 is illustrated in FIGS. 3 to 5. In FIG. 3, the block 1 is a binary information code subdivided into 12-bit elements, and the block 2 represents a sequence of generated 20-bit vectors. FIG. 4 shows the configuration of the data blocks thus formed. The scheme of conversions is illustrated by FIG. 5 where the block E symbolizes the encryption procedures in accordance with the closest prior art method.

EXAMPLE 3

This Example illustrates the application of the secret key to the definition of the law of working out a 1024-byte data block B by using 32-bit elements of the binary information code and 32-bit random binary vectors. The encryption process uses the cipher "Crab" described in the work [Kaliski B. S., Robshaw M. J. B. Fast Block Cipher Proposal. Fast Software Encryption. Proceedings of the Cambridge Security Workshop, Lecture Notes in Computer Science, v. 809, Springer-Verlag, 1994, pp. 26–39; see also B. Schneier, "Applied Cryptography", Second Edition, John Wiley & Sons, Inc., New York, 1966, pp. 342–344]. This cipher serves to convert 1024-byte data blocks presented as a sequence of 32-bit subblocks $B_0$, $B_1$, $B_2$, . . . , $B_{256}$ and uses a secret key in the form of a permutation table and an ordered sequence composed of 2048 subkeys $Q_0$, $Q_1$, $Q_2$, . . . , $Q_{2047}$ having each the length of 32 bits. Let us designate "E" the encryption function defined by the cipher "Crab". The following algorithm describes the procedures relative to Example 3.

Algorithm 3: 512-byte probabilistic cipher
INPUT: 512-byte element of the binary information code presented in the form of a sequence of 32-bit elements of binary information code $p_0$, $p_1$, $p_2$, . . . , $p_{127}$.
1. Form 128 random 32-bit binary vectors $r_0, r_1, r_2, \ldots, r_{127}$.
2. Integrate the 32-bit binary vectors and the 32-bit elements of the binary information code into an intermediate block $$(t_0|t_1|t_2| \ldots |t_{255})$$

where $$(t_0|t_1|t_2| \ldots |t_{127})=(r_0|r_1|r_2| \ldots |r_{127})$$

and $$(t_{128}|t_{129}|t_{130}| \ldots |t_{255})=(p_0|p_1|p_2| \ldots |p_{127}).$$

3. Using the subkeys $Q_0$, $Q_1$, $Q_2$, $Q_3$ and $Q_4$, calculate the parameters $u_1=Q_0$ mod 256, $u_2=Q_1$ mod 256, $u_3=Q_2$ mod 256, s (1)=$Q_3$ mod 8, s (2)=$Q_4$ mod 8.
4. Set up an initial counter value i=0 and establish 32-bit variables $b_0=b_1=b_2=\ldots==b_{255}=0$.
5. Calculate the index $h=[(u_1 \oplus i)^{<<<s(1)}+u_2]^{<<<s(2)} \oplus u_3$.
6. Assign to the variable $b_i$ the value $t_h$: $b_1 \leftarrow t_h$.
7. If I=255, increment i←i+1 and proceed to item 5.
8. Integrate the variables $b_1$ into a 1024-byte data block: $B=b_0|b_1|b_2| \ldots | b_{255}$.
9. Using the cipher "Crab", encrypt the block B: C=E(B), where E denotes the encryption function defined by said cipher.
OUTPUT: a 1024-byte block of encrypted text C.

Items 2, 3, . . . , 7 describe the procedure of linking the elements of the binary information code to the binary vectors based on the secret key and more precisely, on the subkeys $Q_0$, $Q_1$, $Q_2$, $Q_3$, $Q_4$.

Industrial Applicability

As shown by the above Examples, the claimed method of block encryption is technologically feasible and the pursued task is well attainable.

These Examples are easy to implement e.g. on personal computers and allow to produce, on this basis, software encryption modules exhibiting a high resistance to attacks undertaken using selected initial texts.

It is evidenced by these Examples that the proposed method of cryptographic conversions of digital data blocks is technologically feasible and permits to attain the sought objective.

The claimed method may be implemented e.g. on PC, giving the possibility to create on its basis high-speed software encryption modules and to substitute a personal computer equipped with a software system of rapid encryption to the actual expensive and sophisticated encrypting facilities.

What is claimed is:

1. Method of encrypting binary coded information comprising the steps of forming a secret key, working out data blocks containing P≧1 elements of the binary information code, and converting the data blocks under control of the secret key, where D≧1 binary vectors, which are independent of the elements of the binary information code, are additionally generated and the data blocks are worked out by linking the binary vectors to the corresponding elements of the binary information code.

2. The method according to claim 1, wherein the binary vectors are generated at random.

3. The method according to claim 1, wherein the binary vectors are generated at pseudorandom.

4. The method according to claim 1, wherein the binary vectors are linked to the corresponding elements of the binary information code on the basis of the secret key.

5. The method according to claim 1, wherein the number of the data blocks is not less than now.

* * * * *